US012723443B2

(12) United States Patent
Ward

(10) Patent No.: US 12,723,443 B2
(45) Date of Patent: Sep. 1, 2026

(54) LATCHING AND LOCKING SYSTEM FOR AN ACTUATABLE DOOR

(71) Applicant: AIRBUS HELICOPTERS DEUTSCHLAND GMBH, Donauworth (DE)

(72) Inventor: Stephen Ward, Donaumuenster (DE)

(73) Assignee: AIRBUS HELICOPTERS DEUTSCHLAND GMBH (DE)

( * ) Notice: Subject to any disclaimer, the term of this patent is extended or adjusted under 35 U.S.C. 154(b) by 429 days.

(21) Appl. No.: 18/222,574

(22) Filed: Jul. 17, 2023

(65) Prior Publication Data

US 2024/0183202 A1 Jun. 6, 2024

(30) Foreign Application Priority Data

Dec. 2, 2022 (EP) .................................... 22211170

(51) Int. Cl.
*E05B 81/06* (2014.01)
*E05B 81/14* (2014.01)
*B64C 1/14* (2006.01)

(52) U.S. Cl.
CPC .............. *E05B 81/06* (2013.01); *E05B 81/14* (2013.01); *B64C 1/1407* (2013.01)

(58) Field of Classification Search
CPC ....... E05B 81/06; E05B 81/14; B64C 1/1407; B64C 1/14
USPC .......................................................... 292/201
See application file for complete search history.

(56) References Cited

U.S. PATENT DOCUMENTS 3,771,376 A * 11/1973 Larkin .................... F16H 21/54 292/217
4,758,030 A 7/1988 Kupfernagel
5,064,147 A * 11/1991 Noble .................. B64C 1/1407 292/DIG. 31
5,305,969 A * 4/1994 Odell ................... B64C 1/1407 292/259 R
5,337,977 A * 8/1994 Fleming ................. B64C 1/143 D12/345

(Continued)

FOREIGN PATENT DOCUMENTS

CN 204998747 U * 1/2016
CN 107724823 A * 2/2018 .............. E05C 9/16

(Continued)

OTHER PUBLICATIONS

European Search Report for European Application No. EP 22211170.0, Completed by the European Patent Office, Dated Apr. 25, 2023, 13 pages.

*Primary Examiner* — Kristina R Fulton
*Assistant Examiner* — James Edward Ignaczewski
(74) *Attorney, Agent, or Firm* — Brooks Kushman P.C.

(57) ABSTRACT

An actuating system, including a latching and locking system, for an actuatable door. The actuating system comprises a rotatable drive shaft, a rotatable latch shaft a latching device, and a locking device. The latching device includes at least two latches, a latch securing unit for maintaining the at least two latches in the latched position, and at least two lock lever counterparts. The locking device includes a lock lever for engaging with the at least two lock lever counterparts to prevent the latch securing unit from disengaging from the securing position, thereby locking the at least two latches in the latched position when the lock lever is in a locked position.

20 Claims, 5 Drawing Sheets

(56) References Cited

U.S. PATENT DOCUMENTS

| | | | | |
|---|---|---|---|---|
| 6,457,675 | B1 * | 10/2002 | Plude | B64C 1/1415 49/276 |
| 10,526,064 | B2 | 1/2020 | Starman | |
| 2002/0000493 | A1 | 1/2002 | Erben et al. | |
| 2003/0213095 | A1 * | 11/2003 | Jackson | B64C 1/1407 16/110.1 |
| 2011/0049299 | A1 * | 3/2011 | Gowing | B64C 1/143 244/129.5 |
| 2016/0201364 | A1 * | 7/2016 | Starman | E05B 65/001 292/108 |
| 2017/0089106 | A1 * | 3/2017 | Rabois | B64D 29/06 |
| 2019/0218837 | A1 * | 7/2019 | Collins | B64D 29/06 |
| 2021/0229792 | A1 * | 7/2021 | Blum | B64C 1/143 |

FOREIGN PATENT DOCUMENTS

| | | | | |
|---|---|---|---|---|
| CN | 110937101 | A * | 3/2020 | E05B 65/006 |
| DE | 19825405 | C2 | 8/2000 | |
| EP | 0222160 | B1 | 5/1990 | |
| EP | 1270405 | B1 | 5/2006 | |
| EP | 3045387 | A1 | 7/2016 | |
| EP | 2170698 | B1 | 10/2017 | |
| EP | 3147203 | B1 | 2/2018 | |
| FR | 2808770 | A1 | 11/2001 | |
| FR | 2772338 | B1 | 3/2003 | |
| WO | 2014091294 | A1 | 6/2014 | |

* cited by examiner 201
200
220
230
225
210
270
280
290
266
250
B1
B3
240
264
230
A1-2
262
260

SECTION B1 - B3
335
230
340
330
220
355
270
225
384
300
280
357
360
365
370
383
210
290
320
350

Fig. 4

VIEW A1 - 2

335
230
340
220
330
355
264
225
464
463
460
262
260
210
450

LATCHING AND LOCKING SYSTEM FOR AN ACTUATABLE DOOR

CROSS-REFERENCE TO RELATED APPLICATIONS

This application claims priority to European patent application No. EP 22211170.0 filed on Dec. 2, 2022, the disclosure of which is incorporated in its entirety by reference herein.

TECHNICAL FIELD

The present technology relates to an actuating system including a latching and locking system for an actuatable door, in particular for an aircraft door. The present technology further relates to a method of operating such an actuating system for an actuatable door.

BACKGROUND

Actuatable doors and, in particular, fuselage doors in aircrafts usually fulfill the following major functions: they close the aircraft in operation for maintaining a required internal pressure therein, they allow external access to the aircraft on the ground, and they enable safe and quick evacuation of the aircraft in case of an emergency. Therefore, a high level of functional reliability has to be ensured, and robust and safe actuating systems are required for reliably and safely closing the actuatable doors in operation, but also for fulfilling all relevant requirements defined by the competent authorities.

Airworthiness requirements have been defined for fuselage doors in aircrafts with the intention of ensuring multiple layers of protection. These protection layers typically include a latching system, a locking system, indication systems, and pressure prevention means.

As an example, section 783 of the European Union Aviation Safety Agency's "Certification Specifications and Acceptable Means of Compliance for Large Aeroplanes" (EASA CS 25.783) defines requirements for fuselage doors of aircrafts in general.

More specifically, according to EASA CS 25.783(d) (2) such actuating systems require latches and corresponding latching devices that must be designed so that, under all aircraft flight and ground loading conditions, there is no force or torque tending to unlatch the latches in the closed state of the actuatable door. In addition, the latching devices must include means for securing the latches in an associated latched state. The securing of the latches and the latches must be independent from the lock if the latches are latched.

Furthermore, according to EASA CS 25.783(d) (4), each door with an inward opening movement, and for which unlatching could result in hazard, must have a locking means to prevent the latches from becoming disengaged.

The document DE 198 25 405 C2 describes a conventional actuating system for an actuatable door that fulfills these requirements and comprises a plurality of latching devices, each being provided with an associated latching hook that is adapted for latching the actuatable door in a closed position. Each latching hook is securable in its latched state by means of a separate rotatable securing device, which is implemented as a securing cam.

More specifically, each latching hook is pivotally mounted to a first pivot bearing and connected to a pivotable mechanical transmission element via a coupling link. The latter is implemented as a first coupling rod and on the one hand pivotally mounted to the latching hook by means of a second pivot bearing and on the other hand to the pivotable mechanical transmission element by means of a third pivot bearing. The pivotable mechanical transmission element is implemented as a bell crank, which is pivotable around an associated bell crank bolt defining a fourth pivot bearing. The bell crank is further coupled to a latch lever by means of a coupling link, which is implemented as a second coupling rod. The latter is on the one hand pivotally mounted to the bell crank by means of a fifth pivot bearing and on the other hand to the latch lever by means of a sixth pivot bearing. The latch lever is coupled to a rotatable latching shaft, which defines a seventh bearing of the conventional actuating system.

However, the above described conventional actuating system is comparatively complicated and expensive, as each latching device thereof, i.e., without the separate rotatable locking device, comprises multiple constituent components including five moving parts in row with seven bearings involved. Consequently, this conventional actuating system is comparatively heavy and space consuming and manufacturing and assembly thereof is rather complicated due to the great number of components and tolerances.

Other illustrative mechanisms for closing aircraft doors are described in documents U.S. Pat. No. 5,305,969 A, EP 3 045 387 A1, EP 3 147 203 B1, WO 2014/091294 A1, EP 2 170 698 B1, EP 1 270 405 B1, FR 2 772 338 B1, and EP 0 222 160 B1.

More particularly, U.S. Pat. No. 5,305,969 A describes a latch lock mechanism for opening and closing a translating motion-type aircraft door. The latch lock mechanism includes a latch shaft that is mounted to the door by a set of follower bearings that are axially offset from the shaft. The shaft is rotated by a lift lock mechanism that includes a lift lock cam and a cam follower that tracks the cam, and a door drive linkage that is attached to the cam follower for rotating the latch shaft. The lift lock cam is rotated by a handle shaft that is actuated by a handle. When the handle is rotated, the lift lock cam is similarly rotated so as to cause the upward movement of the door drive linkage in the rotation of the latch shaft. The follower bearings rotate about the latch shaft so as to lift the latch shaft and the door upwards so as to allow the door to clear fixed fuselage stop tabs so that the door can be moved to an open position. An auxiliary latch-hold up cam mechanism forces the door open in the event the latch shaft and associated components fail. A pressure vent door is selectively opened by an associated opener assembly connected to the handle shaft. In the event an attempt is made to open the door while the aircraft is in flight, the pressure vent door opener assembly locks out so as to inhibit movement of the handle shaft that would actuate the latch shaft and open the door. The documents CN107724823, U.S. Ser. No. 10/526,064 and FR2808770 were cited.

However, in many of the above-referenced state-of-the-art designs, each of the latching hooks is installed on a separate fixed bolt, which serves as rotation axis for the latching hooks. Each latching hook is driven by the latching shaft via its own drive mechanism. In addition, each drive mechanism serves as latch securing means for its latching hook. Each latching hook is locked by an individual locking device, mounted on the locking shaft. The locking device is locking the latching hook and monitoring the latched position of the latch. Thus, the above-mentioned state-of-the-art solutions have many components which leads to heavy, difficult to assemble, and comparatively expensive to manufacture solutions.

SUMMARY

It is, therefore, an objective to provide a new actuating system for an actuatable door that is suitable to overcome the above-described drawbacks. In particular, the new actuating system should have a very compact design and comprise fewer constituent components, is easier to produce and assemble, and comparatively inexpensive to manufacture compared to state-of-the-art actuating systems. Furthermore, it is an objective to provide a method of operating such a new actuating system.

This objective is solved by an actuating system for an actuatable door, said actuating system comprising the features of disclosure.

More specifically an actuating system for an actuatable door comprises a rotatable drive shaft, a rotatable latch shaft, a latching device, and a locking device. The latching device comprises at least two latches that are non-rotatably mounted to the rotatable latch shaft and adapted for maintaining the actuatable door in a closed position when the at least two latches are in a latched position, a latch securing unit that is adapted for maintaining the at least two latches in the latched position when the latch securing unit is in a securing position, and at least two lock lever counterparts that are non-rotatably mounted to the rotatable latch shaft. The locking device comprises a lock lever that is non-rotatably mounted to the rotatable drive shaft and adapted for engaging with the at least two lock lever counterparts to prevent the latch securing unit from disengaging from the securing position thereby locking the at least two latches in the latched position when the lock lever is in a locked position.

The present technology includes a continuous latch shaft on which two latches are mounted. When the two latches are engaged in the respective fuselage side fittings, the actuatable door is restrained in the correct position relative to the fuselage side stops. When latched, the latch shaft is secured in position by its single operating mechanism, thereby satisfying the necessary latch securing means requirements of the airworthiness regulating authorities.

Once latched, the locking device may be engaged to prevent the latch shaft and the associated latches from unlatching. At the interface between the latching device and the locking device and on the side of the latch mechanism the latch securing unit provides two individual load paths to ensure that, in event of a failure in the latch mechanism, a sufficient number of latches will remain locked, thereby satisfying the single failure requirements defined by the airworthiness regulating authorities.

As one latch is sufficient to maintain the position of the actuatable door relative to the fuselage and each shaft is supported by three bush bearings, which ensure adequate functionality after shaft failure, the single failure criteria for the latching mechanism, as defined by the airworthiness regulating authorities, is fulfilled.

The present technology also ensures that, in the event of a disconnection of one of the two latches from its operating mechanism, net torques or forces will not tend to open the latches.

Furthermore, the latch securing unit and the locking device can be located at any position along the continuous latch shaft, thereby enabling a simplified sensing mechanism that allows to locate a corresponding door status indication panel in a region of the actuatable door that is clearly visible to the door operator.

The obvious benefits of the present technology include a reduction in reoccurring costs due to a reduced part count within the latching device, the locking device, and the door status indication mechanism. The cost of the initial design of the actuating system is reduced compared to state-of-the-art solutions thanks to a less complex design and fewer parts. The reduction in weight that results from the fewer parts should also not be underestimated.

Moreover, the simplified design reduces initial installation and maintenance efforts thanks to fewer adjustments. The risk of an incorrect installation of the actuatable door and/or any mis-adjustment is significantly reduced.

The reduction in the number of parts of the locking device also means that a reduction in the number of associated sensors and targets may be considered.

Furthermore, the reduction in required installation space in the most congested area of the door may allow for increased levels of thermal and acoustic insulation if desired.

According to one aspect, the lock lever and the at least two lock lever counterparts form at least two separate load paths when the lock lever is in the locked position.

If desired, the lock lever has a lock lever contact surface and the at least two lock lever counterparts have respective lock lever counterpart contact surfaces, whereby the lock lever contact surface engages with the respective lock lever counterpart contact surfaces of the at least two lock lever counterparts when the lock lever is in a locked position.

Illustratively, the rotatable drive shaft drives the rotatable latch shaft via the latch securing unit.

According to one aspect, the latch securing unit further comprises a linking element that couples the rotatable drive shaft with the rotatable latch shaft.

If desired, the linking element further may comprise a first bearing that rotatably couples the linking element with a rotatable drive shaft protrusion of the rotatable drive shaft, and a second bearing that rotatably couples the linking element with a rotatable latch shaft protrusion of the rotatable latch shaft.

Illustratively, a rotation of the rotatable drive shaft in latching direction causes, via the first bearing, a movement of the linking element in latching direction that causes, via the second bearing, a rotation of the rotatable latch shaft in latching direction.

If desired, the latching device may further comprise a stop bolt that stops the rotation of the rotatable latch shaft in latching direction when the at least two latches are in the latched position.

According to one aspect, the latching device further comprises an additional stop bolt that stops the rotation of the rotatable drive shaft when the latch securing unit is in the securing position.

Illustratively, the first bearing, the second bearing, the rotatable drive shaft, and the additional stop bolt of the latch securing unit form an overcenter clamp that is in an overcentered position in the securing position.

In the overcentered position, a rotation of the rotatable latch shaft against the latching direction may cause a further rotation of the rotatable drive shaft into the latching direction, thereby pushing the rotatable drive shaft protrusion against the additional stop bolt and maintaining the at least two latches in the latched position.

Illustratively, in the overcentered position, only a rotation of the rotatable drive shaft against the latching direction may cause the overcenter clamp to leave the overcentered position, thereby releasing the latch securing unit from the securing position.

According to one aspect, a further rotation of the rotatable drive shaft against the latching direction causes, via the latch securing unit a rotation of the rotatable latch shaft against the latching direction, thereby releasing the at least two latches from the latched position.

Moreover, a method of operating the actuating system described above includes the following operations: From an unlatched position, rotating the rotatable drive shaft in latching direction to cause, via the latch securing unit, a rotation of the rotatable latch shaft in latching direction that causes a movement of the at least two latches into the latched position; from the latched position, further rotating the rotatable drive shaft in latching direction to cause a movement of the latch securing unit into the securing position; and from the securing position, further rotating the rotatable drive shaft in locking direction to cause a movement of the lock lever into the locked position.

According to one aspect, the method may further include: from the locked position, rotating the rotatable drive shaft against the locking direction to cause a movement of the lock lever from the locked position, a movement of the latch securing unit from the securing position, and, via the latch securing unit, a rotation of the rotatable latch shaft against the latching direction that causes a movement of the at least two latches from the latched position.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 4 is a diagram of another sectional cut through the illustrative actuating system of FIG. 2 showing an illustrative locking device.

DETAILED DESCRIPTION

Figure 1:
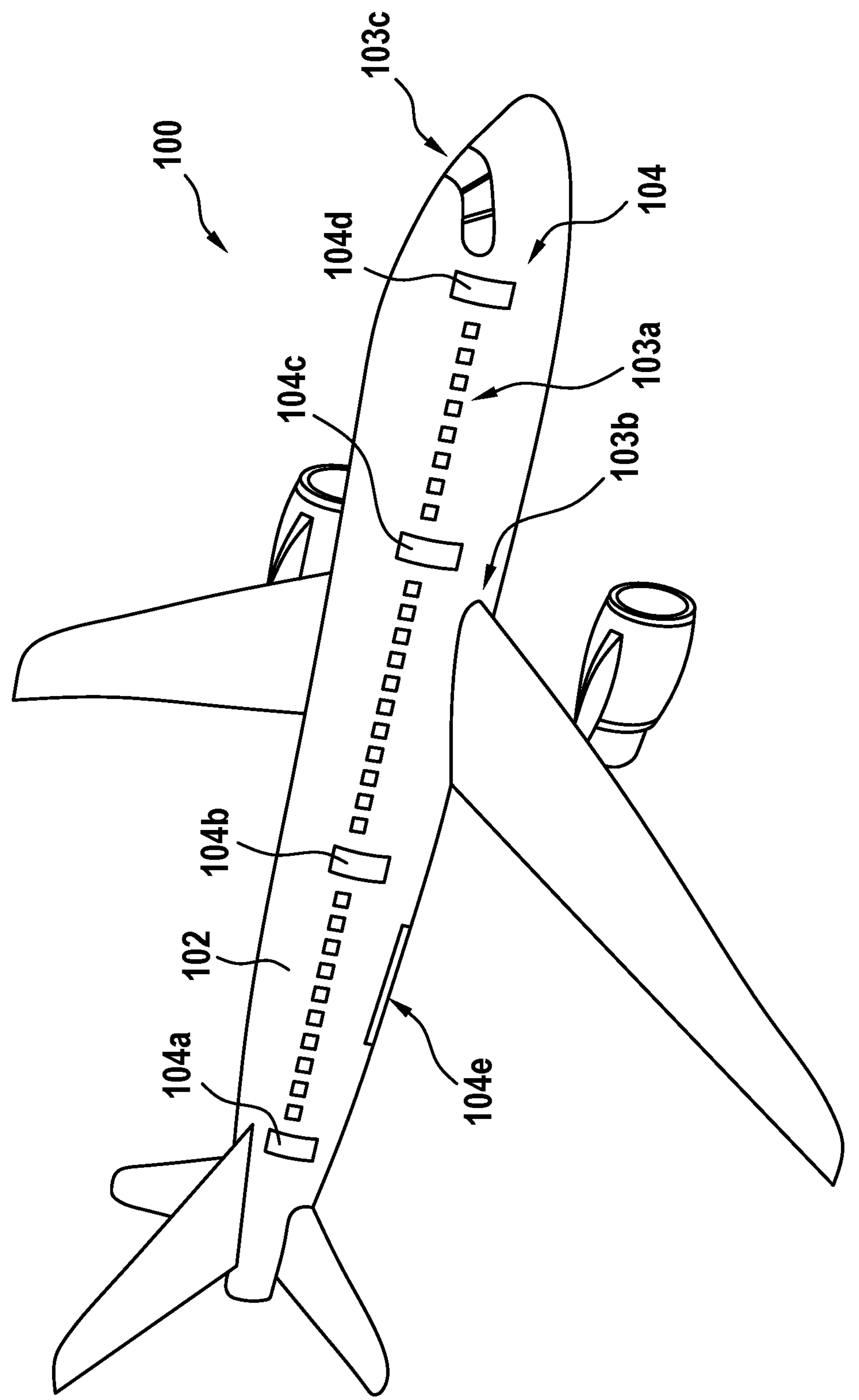
FIG. 1 is a diagram of an illustrative aircraft having several aircraft doors.

FIG. 1 shows an aircraft 100 with an aircraft airframe 102, which is sometimes also referred to as fuselage 102. Illustratively, the aircraft 100 comprises a passenger cabin 103*a*, a cargo deck 103*b*, and a flight deck or cockpit 103*c*. If desired, the aircraft 100 is accessible via a plurality of aircraft doors 104, which exemplarily comprises several cabin access doors 104*a*, 104*b*, 104*c*, and 104*d*, as well as one or more cargo deck access doors 104*e*. By way of example, the passenger cabin 103*a* and the flight deck 103*c* are accessible via the cabin access doors 104*a*, 104*b*, 104*c* and 104*d*, and the cargo deck 103*b* is accessible via the one or more cargo deck access doors 104*e*.

The plurality of aircraft doors 104 may be adapted to close the aircraft airframe 102 in a fluid-tight manner. If desired, at least one of the plurality of aircraft doors 104 is a swiveling aircraft door. Illustratively, at least one of the plurality of aircraft doors 104 is an actuatable door.

If desired, aircraft 100 may include at least one actuatable door 201 as described below with reference to FIG. 2. In other words, one or more of the plurality of aircraft doors 104 may be an actuatable door 201 as described below with reference to FIG. 2.

Illustratively, the actuatable door may be movable between a closed position and an open position. In the closed position, the actuatable door may close an opening in the fuselage 102, thereby preventing access from outside the aircraft 100. In the open position, the actuatable door may provide access from outside the fuselage 102 to the aircraft passenger cabin 103*a*, the aircraft cargo deck 103*b*, and/or the aircraft flight deck 103*c*.

For the remainder of the description, the actuatable door is said to be in the closed position when the actuatable door completely closes the opening in the fuselage 102. As an example, the actuatable door may at least airtightly close the opening in the fuselage 102 when the actuatable door completely closes the opening in the fuselage 102. As another example, the actuatable door may prevent unauthorized access to the fuselage 102 when the actuatable door completely closes the opening in the fuselage 102.

Furthermore, the actuatable door is said to be in a partially open position when the actuatable door partially closes the opening in the fuselage 102, and the actuatable door is said to be in the fully open position when the opening in the fuselage 102 is free of the actuatable door. For example, no part of the opening in the fuselage 102 is covered by the actuatable door in the fully open position.

If desired, the actuatable door may include an actuating system such as actuating system 200 of FIG. 2 described below.

As shown in FIG. 1, aircraft 100 is embodied by an airplane. However, the present embodiments are not limited to airplanes. Instead, any door that closes a boundary between two environments is likewise contemplated. By way of example, the present actuatable door may alternatively be applied to other aircrafts such as helicopters, drones, multicopters, etc., to other vehicles such as ships, spacecrafts, submarines, and so on.

Consequently, the present door is not limited to aircraft doors, but can likewise be applied to any arbitrary door that closes a boundary between two environments. However, for purposes of illustration, the present door is hereinafter described with respect to aircraft doors.

Figure 2:
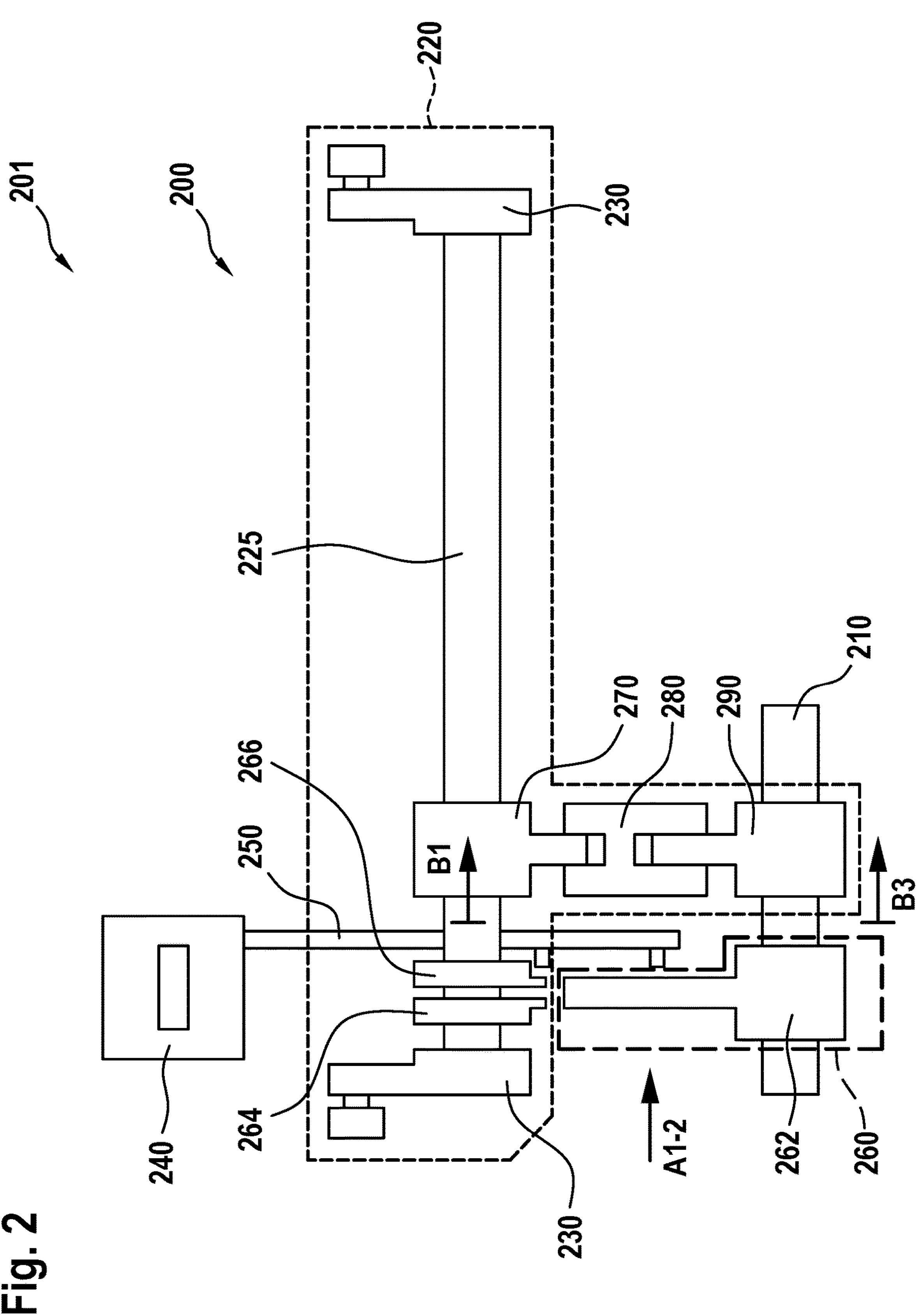
FIG. 2 is a diagram of an illustrative actuating system for an actuatable door.

FIG. 2 shows an actuating system 200 for an actuatable door 201. In other words, FIG. 2 shows an actuatable door 201 comprising actuating system 200. The actuating system 200 is exemplarily adapted for reliably and securely latching and locking the actuatable door 201 in a closed position, such that the actuatable door 201 fulfils all relevant requirements defined by the competent authorities, such as e.g., in EASA CS 25.783.

If desired, the actuatable door 201 may include an indication mechanism 250 that monitors the state of the actuating system 200. For example, the indication mechanism 250 may detect whether the actuating system 200 is in an unlatched and unlocked, latched and unlocked, or latched and locked position.

As shown in FIG. 2, the actuatable door 201 may include a door status indication panel 240. The door status indication panel 240 may indicate the current status of the actuatable door 201 based on the information from the indication mechanism 250. For example, the door status indication panel 240 may indicate whether the actuating system 200 is in an unlatched and unlocked, latched and unlocked, or latched and locked position.

Illustratively, the actuating system 200 includes a rotatable drive shaft 210 and a rotatable latch shaft 225.

By way of example, actuating system 200 includes an actuating device. The actuating device may be adapted for actuating respectively rotating a rotatable actuating shaft. As an example, the actuating device may include an operating handle. If desired, the actuating device may include any device that is able to actuate respectively rotate the rotatable actuating shaft. For example, the actuating device may include a wheel, a knob, or a motor and any other device that is able to control the motor. If desired, the actuating device may be adapted for rotating the rotatable drive shaft 210 in operation.

Actuating system 200 may comprise a latching device 220 and a locking device 260. The latching device 220 is described in more detail below with reference to FIG. 3, and the locking device 260 is described in more detail below with reference to FIG. 4.

Illustratively, the latching device 220 includes at least two lock lever counterparts 264, 266. The at least two lock lever counterparts 264, 266 are non-rotatably mounted to the rotatable latch shaft 225.

As shown in FIG. 2, the locking device 260 includes a lock lever 262. The lock lever 262 is non-rotatably mounted to the rotatable drive shaft 210. Thus, rotation of the rotatable drive shaft 210 causes a rotation of the lock lever 262.

If desired, the lock lever 262 may be non-rotatably mounted to the rotatable drive shaft 210 by means of at least one pin. In other words, the at least one pin may prevent a rotation of the lock lever 262 relative to the second rotatable drive shaft 210.

The lock lever 262 may be adapted for engaging with the at least two lock lever counterparts 264, 266 of the latching device 220. The lock lever 262 engages with the at least two lock lever counterparts 262, 266 to prevent the latch securing unit from disengaging from the securing position, thereby locking the at least two latches 230 in the latched position when the lock lever 262 is in a locked position.

As an example, a single lock lever 262 may engage with two separate lock lever counterparts 264, 266 in the locked position. Thus, the lock lever 262 and the at least two lock lever counterparts 264, 266 form at least two separate load paths.

The latching device 220 includes at least two latches 230. As shown in FIG. 2, the latching device 220 may include exactly two latches 230. The at least two latches 230 are non-rotatably mounted to the rotatable latch shaft 225. Thus, rotation of the rotatable latch shaft 225 causes a rotation of the at least two latches 230.

If desired, a latch of the at least two latches 230 may be non-rotatably mounted to the rotatable latch shaft 225 by means of at least one pin. In other words, the at least one pin may prevent a rotation of the associated latch of the at least two latches 230 relative to the rotatable latch shaft 225.

As shown in FIG. 2, the two latches 230 are non-rotatably mounted to the ends of the rotatable latch shaft 225, a first latch 230 at the forward end and a second latch 230 at the aft end of the rotatable latch shaft 225. The at least two latches 230 are adapted for maintaining the actuatable door 201 in a closed position when the at least two latches 230 are in a latched position.

For example, a latch of the at least two latches 230 may be latchable at an associated counter peg provided at a door frame, non-represented for simplicity and clarity.

Illustratively, the at least two latches 230 may be implemented as hooks, as C-latches, as toggle latches, or as any other latches that may be latchable at associated devices (e.g., counter pegs, cylinders, or shafts) provided at a door frame. If desired, the at least two latches 230 may be implemented as cylinders or shafts and the associated devices provided at a door frame may be implemented as hooks or C-latches.

Illustratively, the latching device 220 includes a latch securing unit. The latch securing unit is adapted for maintaining the at least two latches 230 in the latched position when the latch securing unit is in a securing position.

By way of example, the rotatable drive shaft 210 drives the rotatable latch shaft 225 via the latch securing unit. As shown in FIG. 2, the latch securing unit may include a linking element 280 that couples the rotatable drive shaft 210 with the rotatable latch shaft 225. For example, the rotatable drive shaft 210 may have a rotatable drive shaft protrusion 290, the rotatable latch shaft 225 may have a rotatable latch shaft protrusion 270, and the linking element 280 may couple the rotatable drive shaft protrusion 290 with the rotatable latch shaft protrusion 270.

Figure 3:
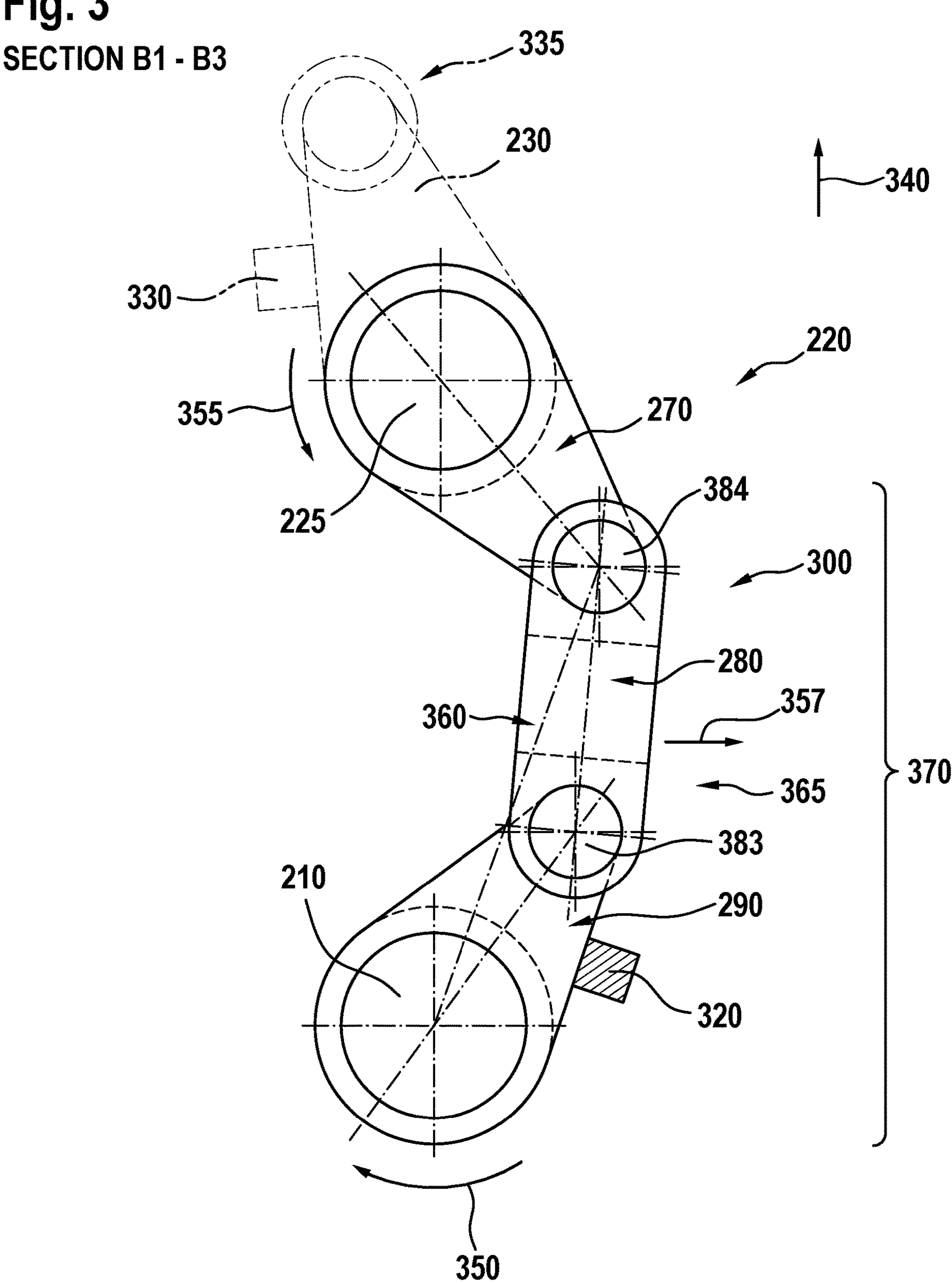
FIG. 3 is a diagram of a sectional cut through the illustrative actuating system of FIG. 2 showing an illustrative latching device.

FIG. 3 is a diagram of a sectional cut along the line B1-B3 through the illustrative actuating system 200 of FIG. 2 showing an illustrative latching device 220 with latch 230 and latch securing unit 300. The latch 230 is shown in FIG. 3 in a latched position 335 in which the latch 230 engages with a counterpart in the door frame to maintain the actuatable door in a closed position, and the latch securing unit 300 is in a securing position 365.

Illustratively, the latch securing unit 300 may include a linking element 280 that couples the rotatable drive shaft 210 with the rotatable latch shaft 225. For example, the linking element 280 may have a first bearing 383 that rotatably couples the linking element 280 with a rotatable drive shaft protrusion 290 of the rotatable drive shaft 210, and a second bearing 384 that rotatably couples the linking element 280 with a rotatable latch shaft protrusion 270 of the rotatable latch shaft 225.

Consider the scenario in which the actuating system 200 is in an unlatched and unlocked position. In this scenario, the actuatable door may be moved in the door opening direction 340 to move the actuatable door from a closed to an open position. When the actuatable door is in the closed position, the actuating system 200 may be transitioned from an unlatched and unlocked position to a latched and unlocked position. Thereby, the rotatable drive shaft 210 may be rotated in latching direction 350. For example, an actuating device (e.g., an electrical or mechanical connection from a door opening device) may rotate the rotatable drive shaft 210 in latching direction 350.

The rotation of the rotatable drive shaft 210 in latching direction 350 may cause, via the first bearing 383, a movement of the linking element 280 in latching direction 357. The movement of the linking element 280 in latching direction 357 may cause, via the second bearing 384, a rotation of the rotatable latch shaft 225 in latching direction 355. Thus, the rotatable drive shaft 210 drives the rotatable latch shaft 225, and a rotation of the rotatable drive shaft 210 in latching direction 350 results in a rotation of the rotatable latch shaft 225 in latching direction 355.

If desired, the latching device 220 may include a stop bolt 330. The stop bolt 330 may stop the rotation of the rotatable latch shaft 225 in latching direction 355 when the at least two latches 230 have reached the latched position 335. Now, the actuating system 200 is in the latched and unlocked position, and the corresponding actuatable door is in the closed position and prevented from moving to an open position.

The rotatable drive shaft 210 may further rotate in latching direction 350 until an additional stop bolt 320 stops the rotation of the rotatable drive shaft 210. When the additional stop bolt 320 stops the rotation of the rotatable drive shaft 210, the latch securing unit 300 is in the securing position 365.

For example, bearings 383, 384, the rotatable drive shaft 210, and the additional stop bolt 320 of the latch securing unit 300 may form an overcenter clamp 370. The overcenter clamp 370 may reach a centered position when the stop bolt 330 stops the rotation of the rotatable latch shaft 225 in latching direction 355. In the centered position, the rotation axes of the bearings 383, 384 and of the rotatable drive shaft 210 are aligned.

Upon a further rotation of the rotatable drive shaft 210 in latching direction 350 from the centered position, the axes of bearing 384 and rotatable drive shaft 210 remain at the same location as in the centered position, while the axis of bearing 383 moves in latching direction 357 until the drive shaft protrusion 290 interacts with the stop bolt 320. At this point, the overcenter clamp 370 has reached an overcentered position 360 and the latch securing unit 300 is in the securing position 365.

In the overcentered position 360, a rotation of the rotatable latch shaft 225 against the latching direction 355 causes a further rotation of the rotatable drive shaft 210 into the latching direction 350, thereby pushing the rotatable drive shaft protrusion 290 against the stop bolt 320 and maintaining the at least two latches 230 in the latched position 335. Thereby, the at least two latches 230 are secured in the latched position by their own latch securing unit 300, which fulfils the requirements of the airworthiness regulating authorities.

Thus, in the overcentered position 360, only a rotation of the rotatable drive shaft 210 against the latching direction 350 causes the overcenter clamp 370 to leave the overcentered position 360, thereby releasing the latch securing unit 300 from the securing position 365.

A further rotation of the rotatable drive shaft 210 against the latching direction 350 causes, via the latch securing unit 300 a rotation of the rotatable latch shaft 225 against the latching direction 355, thereby releasing the at least two latches 230 from the latched position 335. Now, the actuating system 200 has returned to the unlatched and unlocked position.

Figure 4:
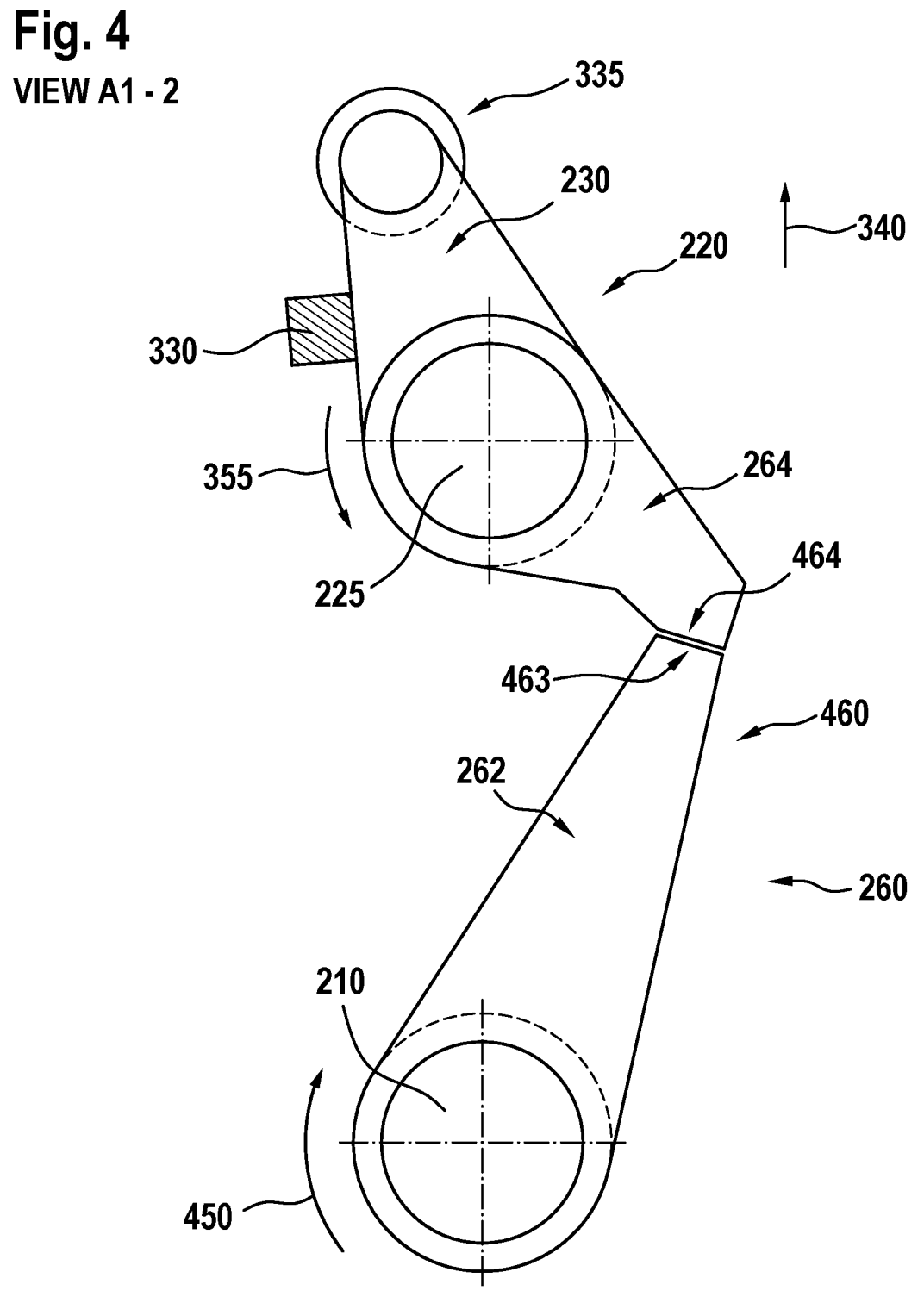

FIG. 4 is a diagram of a sectional cut along view A1-2 through the illustrative actuating system 200 of FIG. 2 showing an illustrative locking device 260. The locking device 260 includes a lock lever 262 that is non-rotatably mounted to the rotatable drive shaft 210.

The lock lever 262 may be adapted for engaging with the at least two lock lever counterparts 264, 266 of the latching device 220 to prevent the latch securing unit (e.g., latch securing unit 300 of FIG. 3) from disengaging from the securing position. Thus, the lock lever 262 of locking device 260 may lock the at least two latches 230 in the latched position 335 when the lock lever 262 is in a locked position 460. When the lock lever 262 is in the locked position 460, the actuating system 200 is in a latched and locked position.

Illustratively, lock lever 262 has a lock lever contact surface 463 and the at least two lock lever counterparts 264, 266 have respective lock lever counterpart contact surfaces 464. When the lock lever 262 is in the locked position 460, the lock lever contact surface 463 engages with the respective lock lever counterpart contact surfaces 464 of the at least two lock lever counterparts 264, 266. Thus, the lock lever 262 and the at least two lock lever counterparts 264, 266 form at least two separate load paths.

Consider the scenario in which the actuating system 200 is in a latched and unlocked position in which the stop bolt 330 has stopped the rotation of the rotatable latch shaft 225 in latching direction 355 and the at least two latches 230 have reached the latched position 335.

In this scenario, a further rotation of the rotatable drive shaft 210 in latching direction 450 may cause the latch securing unit into the securing position and a rotation of the lock lever 262 into the locked position 460.

Starting from the locked position 460, a rotation of the rotatable drive shaft 210 against the locking direction 450 may cause the lock lever 262 to disengage from the at least two lock lever counterparts 264, 266, thereby moving the actuatable system 200 from a latched and locked position to a latched and unlocked position.

The at least two lock lever counterparts 264, 266 provide at least two separate load paths. Each load path is capable of reacting to any load that is generated by the latching device 220 on the locking device 260. Each shaft, rotatable latch shaft 225 and rotatable drive shaft 210 may be supported by three bush/bearing positions, and each one of the at least two latches 230 is capable alone to keep the actuatable door in position relative to the door frame counterparts. Thereby, the requirement of the airworthiness regulating authorities, that after a failure of any individual component within the latching device 220, a sufficient number of latches 230 shall remain engaged is fulfilled.

Figure 5:
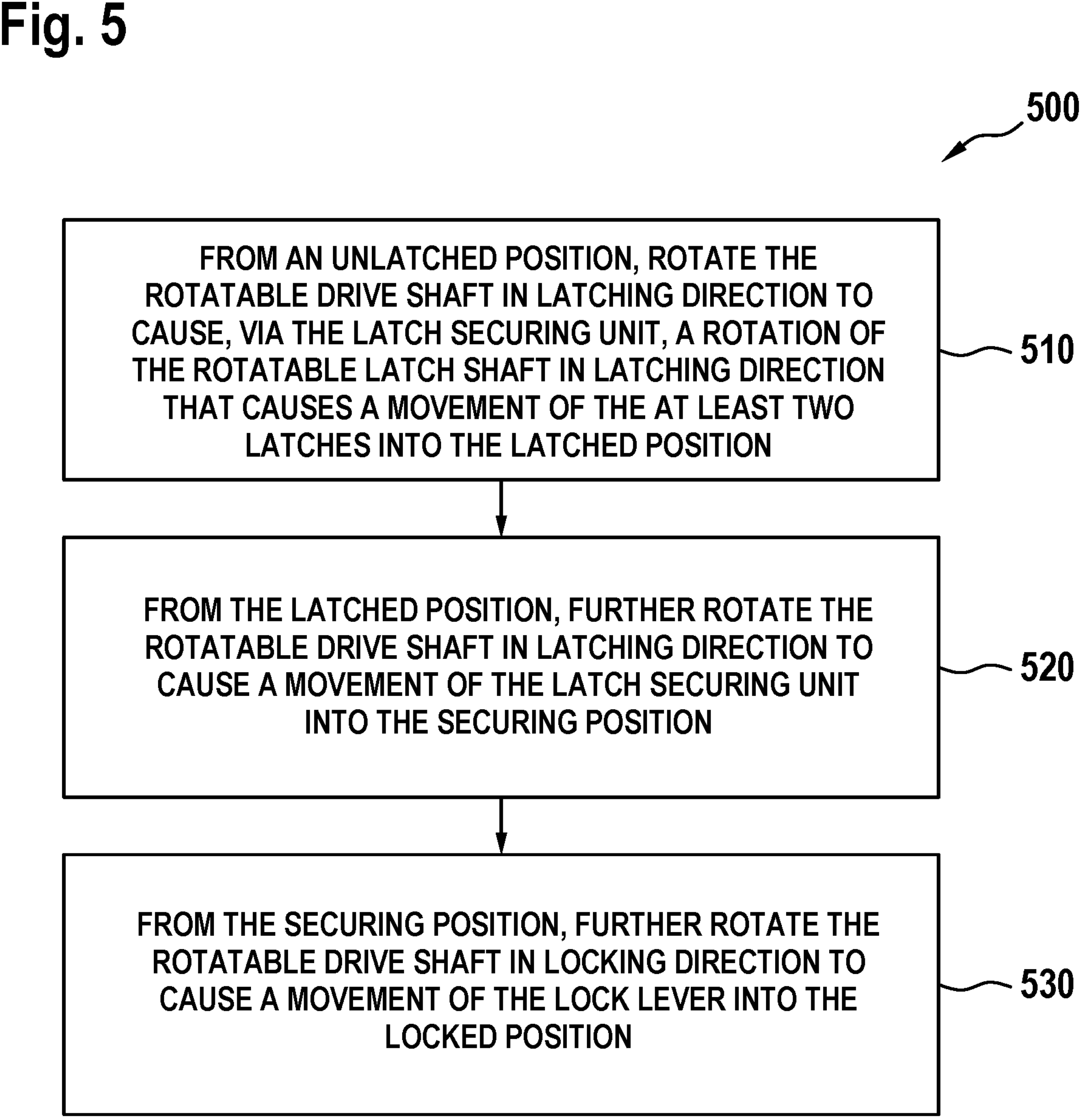
FIG. 5 is a flowchart showing illustrative operations of operating the illustrative actuating system of FIG. 2.

FIG. 5 is a flowchart of a method 500 showing illustrative operations of operating the illustrative actuating system 200 of FIG. 2.

Consider the scenario in which the actuating system is in an unlatched position and the corresponding actuatable door in a closed position. In this scenario, from the unlatched position, an actuating device may, during operation 510, rotate the rotatable drive shaft in latching direction to cause, via the latch securing unit, a rotation of the rotatable latch shaft in latching direction that causes a movement of the at least two latches into the latched position. For example, from the unlatched position, an electrical or manual actuating device may rotate the rotatable drive shaft 210 of FIG. 3 in latching direction 350 to cause, via the latch securing unit 300, a rotation of the rotatable latch shaft 225 in latching direction 355 that causes a movement of the at least two latches 230 into the latched position 335.

From the latched position, the actuating device may, during operation 520, rotate the rotatable drive shaft in latching direction to cause a movement of the latch securing unit into the securing position. For example, from the latched position 335 of FIG. 3, the actuating device may further rotate the rotatable drive shaft 210 in latching direction 350 to cause a movement of the latch securing unit 300 into the securing position 365.

From the securing position, the actuating device may, during operation 530, further rotate the rotatable drive shaft in locking direction to cause a movement of the lock lever into the locked position. For example, from the securing position, the actuating device may further rotate the rotatable drive shaft 210 of FIG. 4 in locking direction 450 to cause a movement of the lock lever 262 into the locked position 460.

If desired, from the locked position, the actuating device may rotate the rotatable drive shaft against the locking direction to cause a movement of the lock lever from the locked position, a movement of the latch securing unit from the securing position, and, via the latch securing unit, a rotation of the rotatable latch shaft against the latching direction that causes a movement of the at least two latches from the latched position. For example, from the locked position 460 of FIG. 4, the actuating device may rotate the rotatable drive shaft 210 against the locking direction 450 to cause a movement of the lock lever 262 from the locked position 460, a movement of the latch securing unit 300 of FIG. 3 from the securing position 365, and, via the latch securing unit 300, a rotation of the rotatable latch shaft 225 against the latching direction 355 that causes a movement of the at least two latches 230 from the latched position 335.

It should be noted that modifications to the above described embodiments are within the common knowledge of the person skilled in the art and, thus, also considered as being part of the present disclosure.

For instance, stop bolt 330 of latching device 220 of FIG. 3 may be omitted when the at least two latches have an implicit stop such as if the latches are in form of a peg that reaches the end of a slot when the actuating system is in the latched position 335. Alternatively, stop bolt 330 may be placed such that it interacts with at least one of the at least two lock lever counterparts 264, 266 of FIG. 4.

Moreover, the actuating system 200 of FIG. 2 is shown with a single lock lever 262 that is adapted for engaging with two lock lever counterparts 264, 266. However, the single lock lever 262 may be adapted for engaging with any number of lock lever counterparts that is greater than 2. For example, the single lock lever 262 may be adapted for engaging with three or four lock lever counterparts.

REFERENCE LIST

100 aircraft
102 aircraft airframe, fuselage
103*a* aircraft passenger cabin
103*b* aircraft cargo deck
103*c* aircraft flight deck
104 aircraft door
104*a*, 104*b*, 104*c*, 104*d* cabin access doors
104*e* cargo deck access door
200 actuating system
201 actuatable door
210 drive shaft
220 latching device
225 latch shaft
230 latch
240 door status indication panel
250 indication mechanism
260 locking device
262 lock lever
264, 266 lock lever counterpart
270 latch shaft protrusion
280 linking element
290 drive shaft protrusion
300 latch securing unit
320, 330 stop bolt
335 latched position
340 door opening direction
350, 355, 357 latching direction
360 overcentered position
365 securing position
370 overcenter clamp
383, 384 bearing
450 locking direction
460 locked position
463 lock lever contact surface
464 lock lever counterpart contact surfaces
500 method
510, 520, 530 operations

What is claimed is:

1. An actuating system for an actuatable door, comprising:
a rotatable drive shaft;
a single continuous rotatable latch shaft;
a latching device comprising:
at least two latches that are non-rotatably mounted to the single continuous rotatable latch shaft and adapted for maintaining the actuatable door in a closed position when the at least two latches are in a latched position,
a latch securing unit that is adapted for maintaining the at least two latches in the latched position when the latch securing unit is in a securing position, and
at least two lock lever counterparts that are non-rotatably mounted to the same single continuous rotatable latch shaft; and
a locking device comprising:
a lock lever that is non-rotatably mounted to the rotatable drive shaft and adapted for engaging with the at least two lock lever counterparts to prevent the latch securing unit from disengaging from the securing position thereby locking the at least two latches in the latched position when the lock lever is in a locked position.

2. The actuating system of claim 1, wherein the lock lever and the at least two lock lever counterparts form at least two separate load paths when the lock lever is in the locked position.

3. The actuating system of claim 1, wherein the lock lever has a lock lever contact surface and the at least two lock lever counterparts have respective lock lever counterpart contact surfaces, and wherein the lock lever contact surface engages with the respective lock lever counterpart contact surfaces of the at least two lock lever counterparts when the lock lever is in a locked position.

4. The actuating system of claim 1, wherein the rotatable drive shaft drives the rotatable latch shaft via the latch securing unit.

5. The actuating system of claim 4, wherein the latch securing unit further comprises:
a linking element that couples the rotatable drive shaft with the rotatable latch shaft.

6. The actuating system of claim 5, wherein the linking element further comprises:
a first bearing that rotatably couples the linking element with a rotatable drive shaft protrusion of the rotatable drive shaft, and
a second bearing that rotatably couples the linking element with a rotatable latch shaft protrusion of the rotatable latch shaft.

7. The actuating system of claim 6, wherein a rotation of the rotatable drive shaft in latching direction causes, via the first bearing, a movement of the linking element in latching direction that causes, via the second bearing, a rotation of the rotatable latch shaft in latching direction.

8. The actuating system of claim 7, wherein the latching device further comprises:
a stop bolt that stops the rotation of the rotatable latch shaft in latching direction when the at least two latches are in the latched position.

9. The actuating system of claim 8, wherein the latching device further comprises:
an additional stop bolt that stops the rotation of the rotatable drive shaft when the latch securing unit is in the securing position.

10. The actuating system of claim 9, wherein the first bearing, the second bearing, the rotatable drive shaft, and the additional stop bolt of the latch securing unit form an overcenter clamp that is in an overcentered position in the securing position.

11. The actuating system of claim 10, wherein, in the overcentered position, a rotation of the rotatable latch shaft against the latching direction causes a further rotation of the rotatable drive shaft into the latching direction, thereby pushing the rotatable drive shaft protrusion against the additional stop bolt and maintaining the at least two latches in the latched position.

12. The actuating system of claim 10, wherein, in the overcentered position, only a rotation of the rotatable drive shaft against the latching direction causes the overcenter clamp to leave the overcentered position, thereby releasing the latch securing unit from the securing position.

13. The actuating system of claim 12, wherein a further rotation of the rotatable drive shaft against the latching direction causes, via the latch securing unit a rotation of the rotatable latch shaft against the latching direction, thereby releasing the at least two latches from the latched position.

14. A method of operating the actuating system of claim 1, comprising:

from an unlatched position, rotating the rotatable drive shaft in latching direction to cause, via the latch securing unit, a rotation of the rotatable latch shaft in latching direction that causes a movement of the at least two latches into the latched position;

from the latched position, further rotating the rotatable drive shaft in latching direction to cause a movement of the latch securing unit into the securing position; and from the securing position, further rotating the rotatable drive shaft in locking direction to cause a movement of the lock lever into the locked position.

15. The method of claim 14, further comprising:

from the locked position, rotating the rotatable drive shaft against the locking direction to cause a movement of the lock lever from the locked position, a movement of the latch securing unit from the securing position, and, via the latch securing unit, a rotation of the rotatable latch shaft against the latching direction that causes a movement of the at least two latches from the latched position.

16. An actuating system for an actuatable door, comprising:

a rotatable drive shaft;

a common rotatable latch shaft;

at least two latches that are non-rotatably mounted to the common rotatable latch shaft and configured to maintain the actuatable door in a closed position when in a latched state;

at least two lock lever counterparts that are non-rotatably mounted to the common rotatable latch shaft; and a locking device comprising a lock lever that is non-rotatably mounted to the rotatable drive shaft, wherein the lock lever is movable into a locked position in which the lock lever simultaneously engages the at least two lock lever counterparts to lock the common rotatable latch shaft against rotation;

wherein, in the locked position, a first engagement interface between the lock lever and a first one of the at least two lock lever counterparts forms a first separate load path for transferring load from the common rotatable latch shaft to the locking device, and a second engagement interface between the lock lever and a second one of the at least two lock lever counterparts forms a second separate load path for transferring load from the common rotatable latch shaft to the locking device.

17. The actuating system of claim 16, wherein the at least two lock lever counterparts are spaced apart along the common rotatable latch shaft, and wherein the common rotatable latch shaft extends continuously between the at least two lock lever counterparts.

18. The actuating system of claim 16, wherein the lock lever is a single lock lever configured to simultaneously engage each of the at least two lock lever counterparts in the locked position.

19. The actuating system of claim 16, further comprising a latch securing unit that couples the rotatable drive shaft and the common rotatable latch shaft and that is configured to maintain the at least two latches in the latched state when the latch securing unit is in a securing position, wherein the lock lever, when in the locked position, engages the at least two lock lever counterparts to prevent the latch securing unit from disengaging from the securing position.

20. The actuating system of claim 16, wherein the at least two latches comprise a first latch non-rotatably mounted proximate a first end of the common rotatable latch shaft and a second latch non-rotatably mounted proximate an opposite second end of the common rotatable latch shaft.

* * * * *